(12) United States Patent
Chang

(10) Patent No.: US 9,112,315 B2
(45) Date of Patent: Aug. 18, 2015

(54) USB POWER ADAPTER FOR AC AND DC POWER

(71) Applicant: Quietek Corporation, New Taipei (TW)

(72) Inventor: Kao-Chun Chang, New Taipei (TW)

(73) Assignee: Quietek Corporation, New Taipei (TW)

( * ) Notice: Subject to any disclaimer, the term of this patent is extended or adjusted under 35 U.S.C. 154(b) by 371 days.

(21) Appl. No.: 13/757,351

(22) Filed: Feb. 1, 2013

(65) Prior Publication Data

US 2014/0218974 A1    Aug. 7, 2014

(51) Int. Cl.
| | |
|---|---|
| *H01R 13/66* | (2006.01) |
| *H02M 1/10* | (2006.01) |
| *H01R 24/58* | (2011.01) |
| *H01R 31/06* | (2006.01) |
| *H02M 3/335* | (2006.01) |
| *H02M 1/00* | (2007.01) |
| *H01R 103/00* | (2006.01) |

(52) U.S. Cl.
CPC ........ *H01R 13/6658* (2013.01); *H01R 13/6675* (2013.01); *H01R 24/58* (2013.01); *H01R 31/065* (2013.01); *H02M 1/10* (2013.01); *H01R 2103/00* (2013.01); *H02M 3/335* (2013.01); *H02M 2001/007* (2013.01)

(58) Field of Classification Search
CPC .......................... H02M 7/003; H02M 3/33507
See application file for complete search history.

(56) References Cited

U.S. PATENT DOCUMENTS

| | | | | | |
|---|---|---|---|---|---|
| 5,625,275 | A | * | 4/1997 | Tanikawa et al. | 320/160 |
| D574,833 | S | * | 8/2008 | Hussaini et al. | D14/432 |
| 8,491,317 | B2 | * | 7/2013 | Vardanyan | 439/131 |
| D715,735 | S | * | 10/2014 | Levy | D13/110 |
| 8,988,040 | B2 | * | 3/2015 | Levy et al. | 320/107 |
| 2007/0126290 | A1 | * | 6/2007 | Jaynes et al. | 307/150 |
| 2008/0284371 | A1 | * | 11/2008 | Hsu | 320/111 |
| 2014/0152257 | A1 | * | 6/2014 | Miller et al. | 320/111 |

\* cited by examiner

*Primary Examiner* — Emily P Pham
(74) *Attorney, Agent, or Firm* — C. G. Mersereau; Nikolai & Mersereau, P.A.

(57) ABSTRACT

A USB power adapter for AC and DC power has a circuit board, a base and a top cover. The base and the top cover receive the circuit board therein. The circuit board has an AC conversion module, a DC conversion module, and a USB connection port. The base has a cigarette lighter electrically connected to the DC conversion module. The top cover has a pair of blades electrically connected to the AC conversion module. The AC power inputted through the pair of blades is converted by the AC conversion and the DC conversion module into the power outputted through the USB connection port. Accordingly, it is unnecessary to prepare a dedicated AC or DC charger depending upon the type of power source or to prepare a charger requiring many replaceable plugs. The inconvenience caused by carrying and operating those chargers or plugs can be resolved.

12 Claims, 7 Drawing Sheets

USB POWER ADAPTER FOR AC AND DC POWER

BACKGROUND OF THE INVENTION

1. Field of the Invention

The present invention relates to a USB (Universal Serial Bus) power adapter and more particularly to a USB power adapter capable of receiving power from AC and DC power sources.

2. Description of the Related Art

Latest electronic products, such as notebook computers, mobile phones, MP3 players and the like, become more and more diversified with widespread marketplace acceptance. Those electronic products are supplied by batteries to acquire their operating power, and the batteries are charged by chargers connected to AC power sources or through the power pins of USB ports of other electronic products. Although electronic products can be charged through charging ports or USB ports with compatible specifications, right types of chargers are needed to correspond to the connected power sources. For example, an AC to DC charger should be prepared at home or in the office to convert the 110V AC power into 5V DC power, and a DC to DC charger should be prepared in a vehicle to convert 12V or 24V DC power to 5V DC power. Hence, inconvenience arises because users need to purchase or carry various chargers for desired voltage types. Conventional universal chargers are equipped with replaceable plugs to correspond to various AC receptacles or vehicle power sockets. However, it is still inconvenient for users to carry many different types of plugs for the purpose of operation.

SUMMARY OF THE INVENTION

An objective of the present invention is to provide a USB power adapter for AC and DC power.

To achieve the foregoing objective, the USB power adapter for AC and DC power has a circuit board, a base and a top cover.

The circuit board has a USB connection port, an AC conversion module, and a DC conversion module.

The AC conversion module has an input terminal and an output terminal.

The DC conversion module has an input terminal and an output terminal. The input terminal of the DC conversion module is electrically connected to the output terminal of the AC conversion module. The output terminal of the DC conversion module is electrically connected to the USB connection port.

The base takes a form of a hollow shell and has an open top, a receiving chamber, a rectangular notch and a cigarette lighter.

The receiving chamber is centrally formed in the base for the circuit board to be received therein.

The rectangular notch is formed through a proximal end of the base to correspond to the USB connection port of the circuit board.

The cigarette lighter is formed on and protruding from a distal end of the base opposite to the proximal end of the base, and has a power connection pin and two spring leaves. The power connection pin and the two spring leaves are electrically connected to the input terminal of the DC conversion module.

The top cover takes a form of a hollow shell and has a top bottom, two parallel slots and a pair of blades.

An edge of the open bottom of the top cover matches an edge of the open top of the base for the top cover to be correspondingly mounted on the base.

The parallel slots are formed in a top of the top cover.

Each of the pair of blades is pivotally mounted on an inner wall of one of the parallel slots, and the pair of blades is electrically connected to the input terminal of the AC conversion module.

With the USB power adapter for AC and DC power composed of the foregoing elements, the pair of blades of the top cover can be plugged in an AC outlet at home or in the office to acquire AC power, and the cigarette lighter of the base can be connected to a vehicle cigarette lighter socket to acquire DC power. The AC power inputted through the pair of blades is converted into a power to the USB connection port by the AC conversion module and the DC conversion module. The DC power inputted through the cigarette lighter is converted into the power to the USB connection port by the DC conversion module, and a 5V DC power is outputted from the USB connection port to charge an electronic product. When the USB power adapter is not connected to an AC power source, the pair of blades is pivoted to reduce the size of the USB power adapter for easy operation and portability. When the USB power adapter is used to charge an electronic product, neither extra AC or DC chargers, nor various types of plugs for universal chargers with replaceable plugs need to be prepared in response to different types of power source. The inconvenience caused by carrying and operating those conventional chargers or plugs can be resolved.

Other objectives, advantages and novel features of the invention will become more apparent from the following detailed description when taken in conjunction with the accompanying drawings.

DETAILED DESCRIPTION OF THE INVENTION

Figure 1:
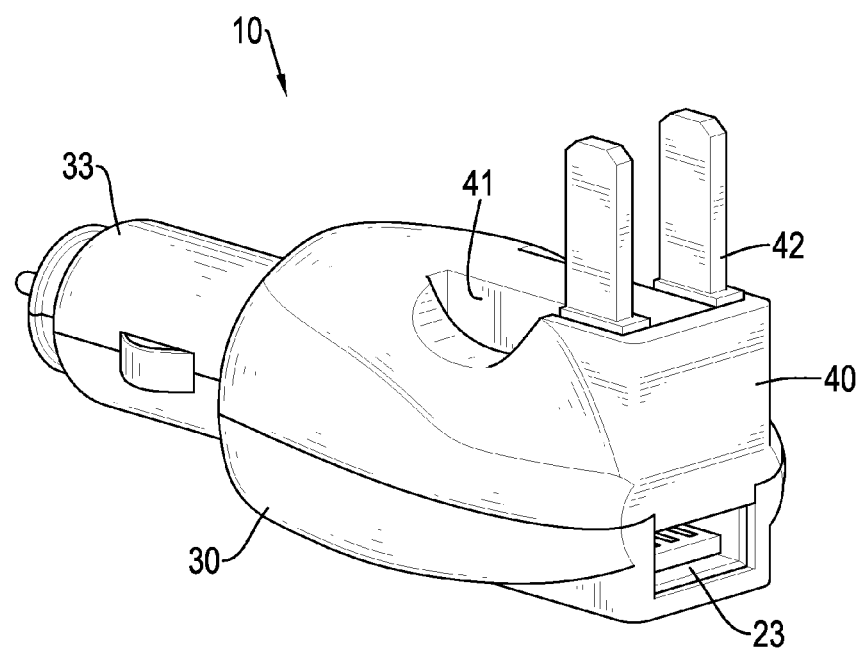
FIG. 1 is a perspective view of a first embodiment of a USB power adapter for AC and DC power.
Figure 2:
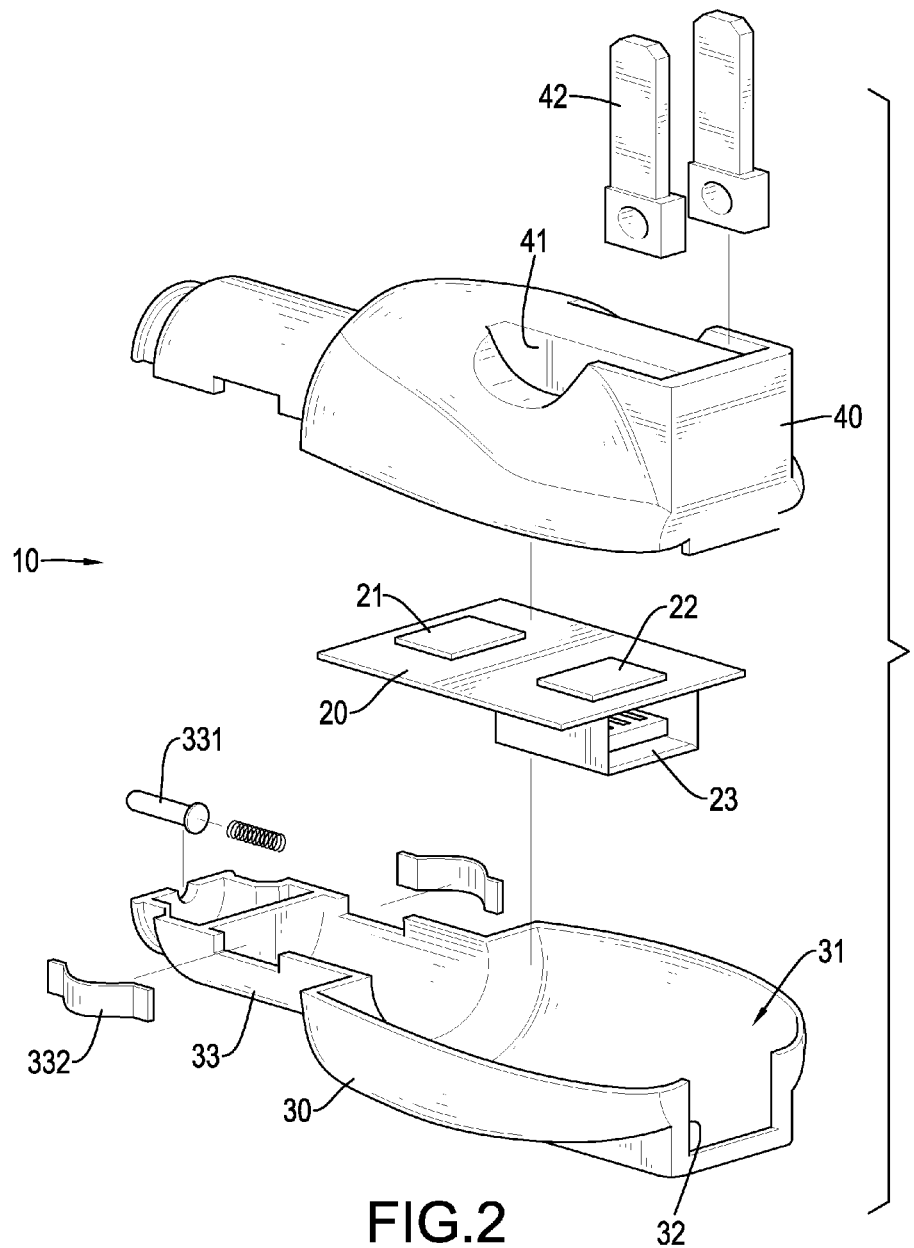
FIG. 2 is an exploded perspective view of the USB power adapter for AC and DC power in FIG. 1.

With reference to FIGS. 1 and 2, a first embodiment of a USB power adapter for AC and DC power 10 in accordance with the present invention has a circuit board 20, a base 30 and a top cover 40. The circuit board 20 serves to convert an externally inputted AC power or a DC power into a 5V DC power and output the 5V DC power to charge an electronic product. The top cover 40 and the base 30 receive the circuit board 20 therein.

The circuit board 20 has an AC conversion module 21, a DC conversion module 22 and a USB connection port 23. The AC conversion module 21 and the DC conversion module 22 are mounted on a top surface of the circuit board 20. The USB connection port 23 is mounted on a bottom surface of the circuit board 20. The DC conversion module 22 has an input terminal electrically connected to the AC conversion module 21 and an output terminal electrically connected to the USB connection port 23.

The base 30 takes the form of a hollow shell and has an open top, a receiving chamber 31, a rectangular notch 32 and a cigarette lighter 33. The receiving chamber 31 is centrally formed in the base 30 for the circuit board 20 to be received therein. The rectangular notch 32 is formed through a proximal end of the base 30 to correspond to the USB connection port 23 of the circuit board 20 for a rectangular opening of the USB connection port 23 to be exposed from the rectangular notch 32. The cigarette lighter 33 is formed on and protrudes from a distal end of the base 30 opposite to the proximal end of the base 30, and has a power connection pin 331 and two spring leaves 332. The power connection pin 331 and the two spring leaves 332 are electrically connected to the input terminal of the DC conversion module 22.

Figure 3:
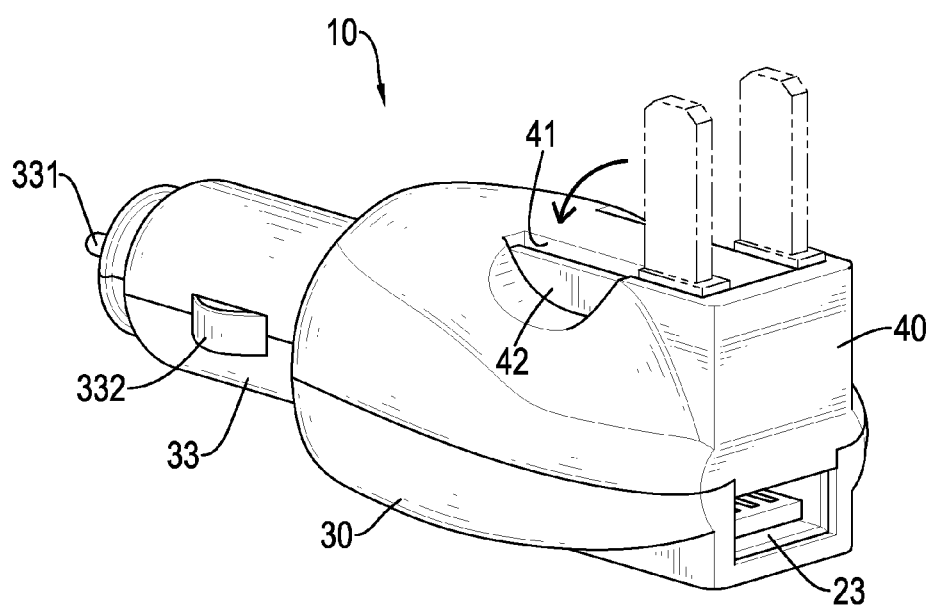
FIG. 3 is an operational perspective view of the USB power adapter for AC and DC power with a pair of foldable blades.

The top cover 40 takes the form of a hollow shell and has an open bottom. An edge of the open bottom of the top cover 40 matches an edge of the open top of the base 30 so that the top cover 40 can be correspondingly mounted on the base 30 with the edges of the open bottom of the top cover 40 and the open top of the base 30 being connected to each other. The top cover 40 has two parallel slots 41 and a pair of blades 42. The parallel slots 41 are formed in a top of the top cover 40. Each of the pair of blades 42 is pivotally mounted on an inner wall of one of the parallel slots 41 and is pivotable for storage or operation. With reference to FIG. 3, when not in use, the pair of blades 42 is pivoted and received in the parallel slots 41 to make the USB power adapter more compact. The pair of blades 42 is electrically connected to an input terminal of the AC conversion module 21.

Figure 4:
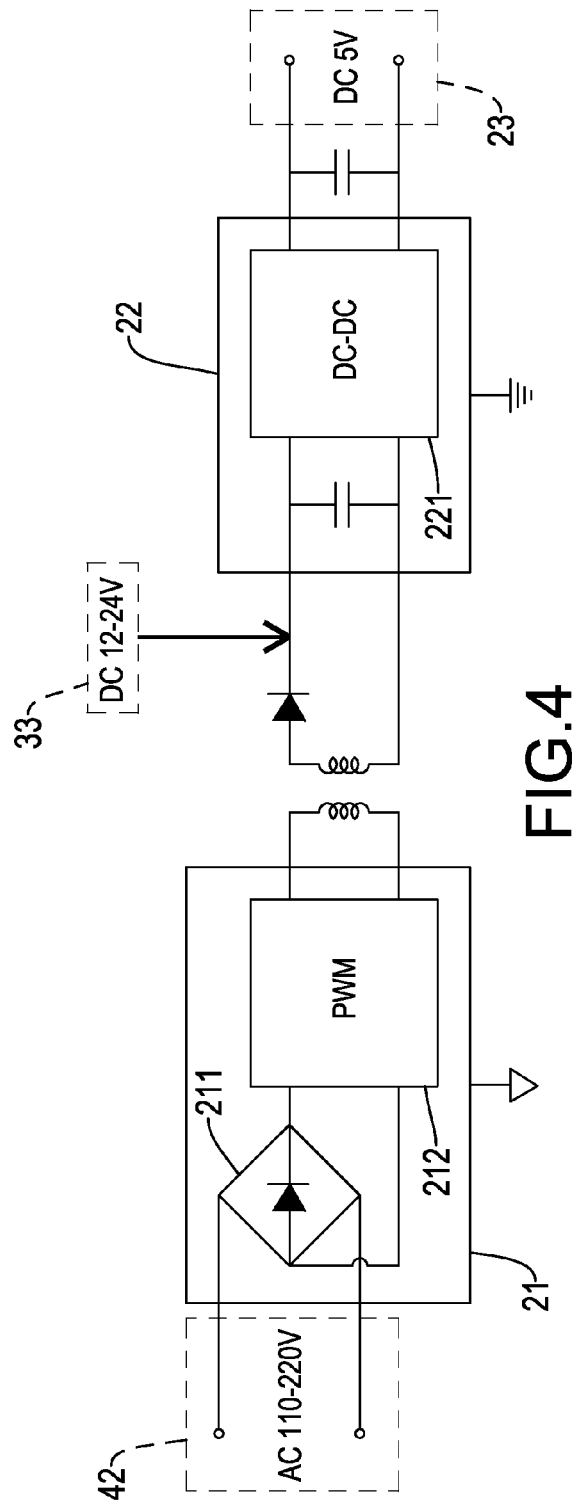
FIG. 4 is a circuit block diagram of the USB power adapter for AC and DC power in FIG. 1.
Figure 5A:
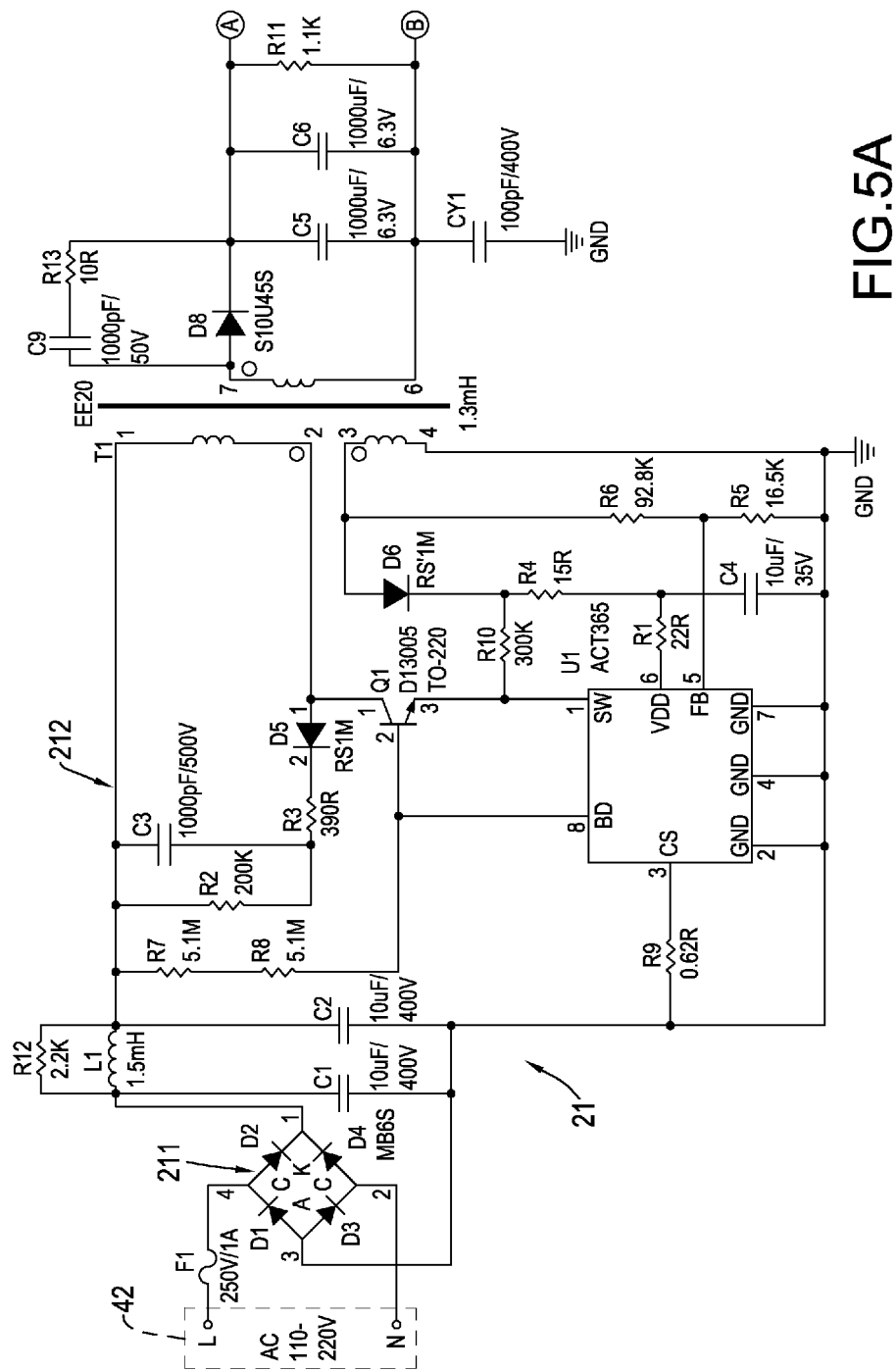
FIG. 5A is a partial circuit diagram of the USB power adapter for AC and DC power in FIG. 4.
Figure 5B:
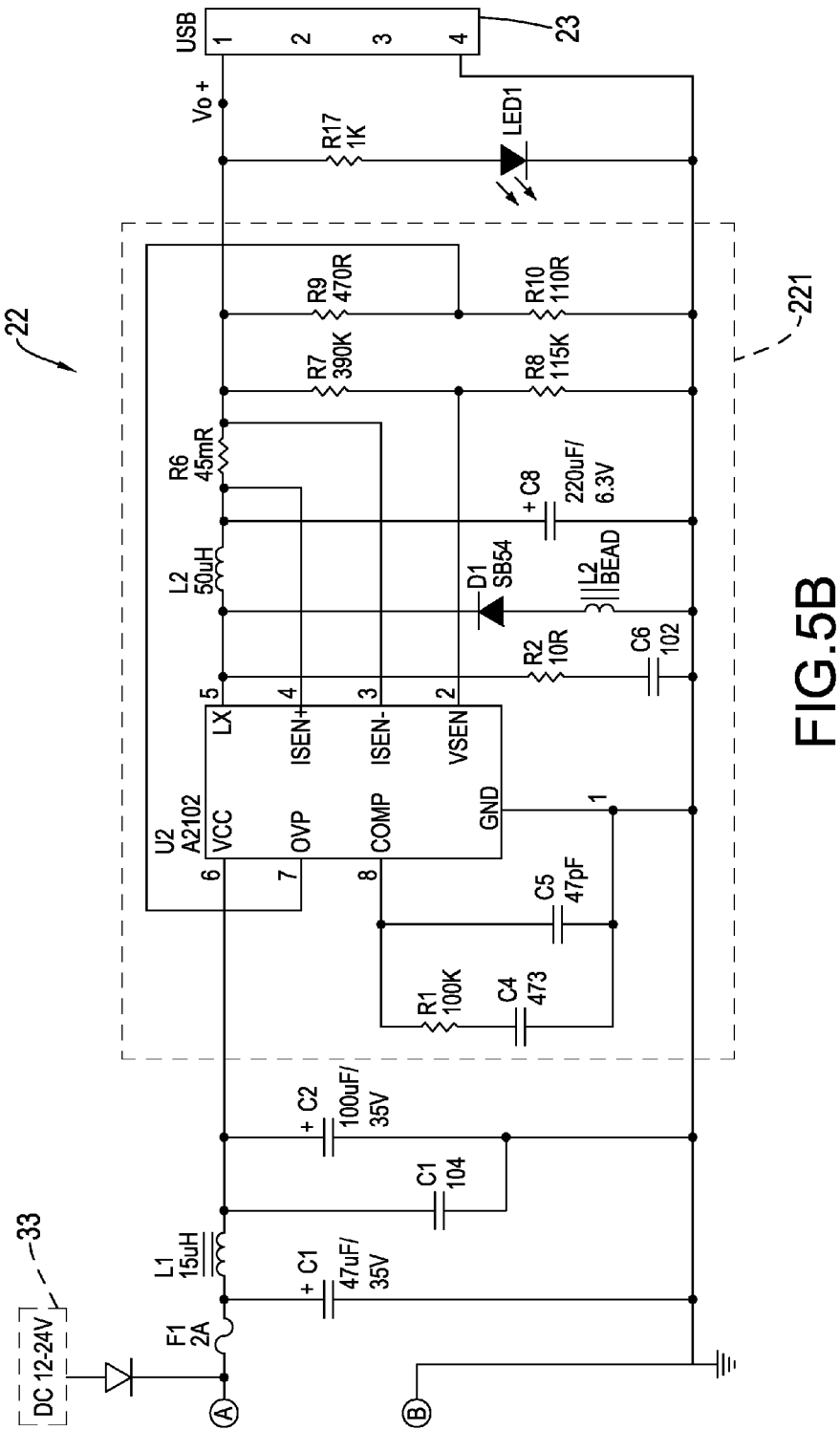
FIG. 5B is another partial circuit diagram of the USB power adapter for AC and DC power in FIG. 4.

With reference to FIGS. 4, 5A and 5B, the AC conversion module 21 has a full-wave rectifier 211 and a pulse width modulation (PWM) module 212. The input terminal of the AC conversion module 21 is connected to the pair of blades 42 to supply an AC power (110V~220V), which is converted into a low-voltage DC power through the full-wave rectifier 211 and the PWM module 212. The PWM module 212 has a PWM controller U1 and a transistor Q1 connected to the PWM controller U1. The transistor Q1 is controlled by the PWM controller U1 to apply PWM to a high voltage outputted from the full-wave rectifier 211 and to convert the modulated voltage into a low DC voltage. After the low DC voltage is further converted by a transformer T1 and is filtered by two filtering capacitors C5, C6, a stable low-voltage DC power can be obtained from an output terminal of the AC conversion module 21.

The input terminal of the DC conversion module 22 is connected to the output terminal of the AC conversion module 21 and the cigarette lighter 33. The DC conversion module 22 has a DC to DC converter 221 converting the low-voltage DC power outputted from the AC conversion module 21 and a DC power (12V-24V) inputted to the cigarette lighter 33 to a low-voltage DC power (5V) good for the operation of the USB connection port 23. The DC to DC converter 221 has a controller U2. The controller U2 has a pair of current detection pins ISEN+, ISEN− and an over-voltage protection (OVP) pin. The pair of current detection pins ISEN+, ISEN− is connected to two ends of a resistor R6 connected to an output terminal LX of the controller U2 to detect current outputted from the controller U2. The OVP pin is connected between two series-connected resistors R9, R10, which are parallelly connected between the output terminal LX and a ground terminal GND of the controller U2, to detect and maintain voltage outputted from the controller U2. The controller U2 maintains that the DC to DC converter 221 outputs stable DC voltage and current. The output terminal of the DC conversion module 22 is connected to the USB connection port 23 to output a 5V DC power.

Figure 6:
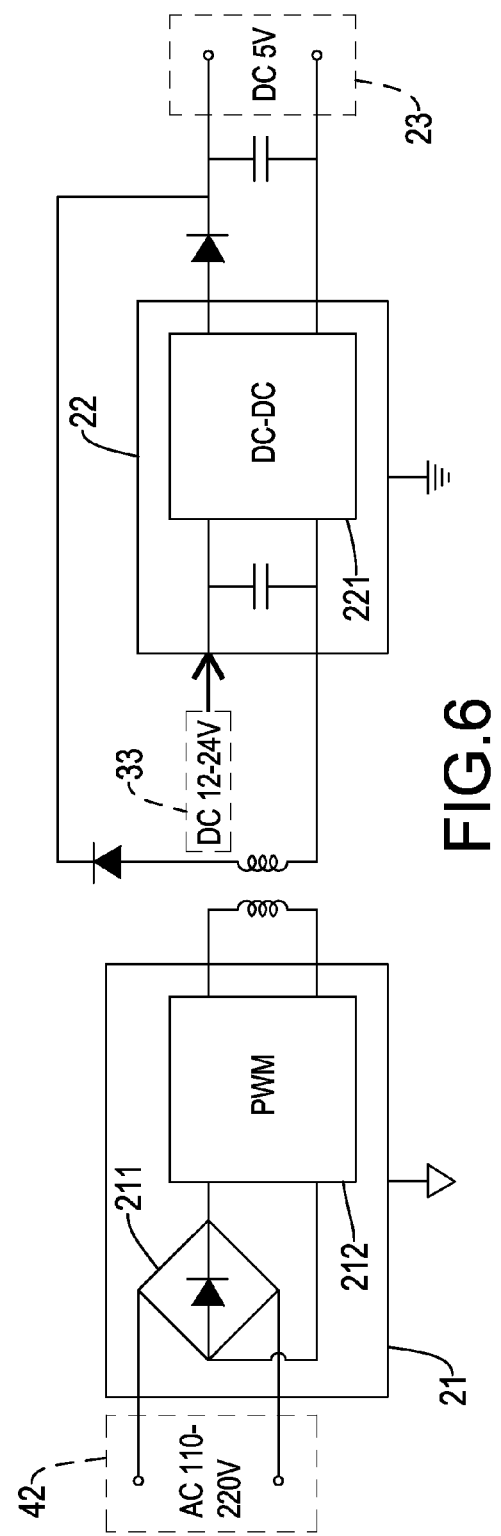
FIG. 6 is a circuit block diagram of a second embodiment of a USB power adapter for AC and DC power.

With reference to FIG. 6, a second embodiment of a USB power adapter for AC and DC power in accordance with the present invention is substantially the same as the first embodiment except that the output terminal of the AC conversion module 21 is connected to the USB connection port 23 through a transformer and a diode. Hence, after the PWM applied by the PWM controller U1 of the PWM module 212, a 5V DC power from the output terminal of the AC conversion module 21 can be directly outputted to the USB connection port 23.

In sum, the pair of blades 42 of the USB power adapter for AC and DC power 10 can be plugged in an AC outlet at home or in the office to acquire an AC power. The cigarette lighter 33 of the base 30 is connected to a vehicle cigarette lighter socket to acquire a DC power. After the AC power or the DC power is converted into a 5V DC power through the AC conversion module 21 and the DC conversion module 22, or through the DC power conversion module 22, the 5V DC power is outputted through the USB connection port 23. When the USB power adapter 10 is not connected to an AC power source, the pair of blades 42 is pivoted for storage to reduce the size of the USB power adapter 10. Accordingly, it is unnecessary to prepare a dedicated AC or DC charger depending upon the type of power source or to prepare a charger requiring many replaceable plugs. The inconvenience caused by carrying and operating those chargers or plugs can be resolved.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A USB (Universal Serial Bus) power adapter for AC and DC power, comprising:
   a circuit board having:
      a USB connection port;
      an AC conversion module having an input terminal and an output terminal; and
      a DC conversion module having:
         an input terminal electrically connected to the output terminal of the AC conversion module; and
         an output terminal electrically connected to the USB connection port;
   a base taking a form of a hollow shell and having:
      an open top;
      a receiving chamber centrally formed in the base for the circuit board to be received therein;
      a rectangular notch formed through a proximal end of the base to correspond to the USB connection port of the circuit board; and
      a cigarette lighter formed on and protruding from a distal end of the base opposite to the proximal end of the base, and having a power connection pin and two spring leaves, wherein the power connection pin and the two spring leaves are electrically connected to the input terminal of the DC conversion module; and a top cover taking a form of a hollow shell and having:
an open bottom, wherein an edge of the open bottom of the top cover matches an edge of the open top of the base for the top cover to be correspondingly mounted on the base;
two parallel slots formed in a top of the top cover; and
a pair of blades, each of the pair of blades pivotally mounted on an inner wall of one of the parallel slots, and the pair of blades electrically connected to the input terminal of the AC conversion module.

2. The USB power adapter for AC and DC power as claimed in claim 1, wherein the AC conversion module further has:
a full-wave rectifier having an input terminal connected to the pair of blades; and
a pulse width modulation (PWM) module connected to the full-wave rectifier and having an output terminal connected to the input terminal of the DC conversion module.

3. The USB power adapter for AC and DC power as claimed in claim 1, wherein the DC conversion module further has a DC to DC converter, and the DC to DC converter has:
an input terminal connected to the output terminal of the PWM module; and
an output terminal connected to the USB connection port.

4. The USB power adapter for AC and DC power as claimed in claim 2, wherein the DC conversion module further has a DC to DC converter, and the DC to DC converter has:
an input terminal connected to the output terminal of the PWM module; and
an output terminal connected to the USB connection port.

5. The USB power adapter for AC and DC power as claimed in claim 3, wherein the DC to DC converter further has a controller, and the controller has:
a pair of current detection pins connected to two ends of a resistor connected to an output terminal of the controller; and
an over-voltage protection pin connected between two series-connected resistors parallelly connected between the output terminal and a ground terminal of the controller.

6. The USB power adapter for AC and DC power as claimed in claim 4, wherein the DC to DC converter further has a controller, and the controller has:
a pair of current detection pins connected to two ends of a resistor connected to an output terminal of the controller; and
an over-voltage protection pin connected between two series-connected resistors parallelly connected between the output terminal and a ground terminal of the controller.

7. A USB power adapter for AC and DC power, comprising:
a circuit board having:
a USB connection port;
an AC conversion module having an input terminal and an output terminal; and
a DC conversion module having an input terminal and an output terminal;
wherein the output terminals of the AC conversion module and the DC conversion module are electrically connected to the USB connection port;

a base taking a form of a hollow shell and having:
an open top;
a receiving chamber centrally formed in the base for the circuit board to be received therein;
a rectangular notch formed through a proximal end of the base to correspond to the USB connection port of the circuit board; and
a cigarette lighter formed on and protruding from a distal end of the base opposite to the proximal end of the base, and having a power connection pin and two spring leaves, wherein the power connection pin and the two spring leaves are electrically connected to the input terminal of the DC conversion module; and
a top cover taking a form of a hollow shell and having:
an open bottom, wherein an edge of the open bottom of the top cover matches an edge of the open top of the base for the top cover to be correspondingly mounted on the base;
two parallel slots formed in a top of the top cover; and
a pair of blades, each of the pair of blades pivotally mounted on an inner wall of one of the parallel slots, and the pair of blades electrically connected to the input terminal of the AC conversion module.

8. The USB power adapter for AC and DC power as claimed in claim 7, wherein the AC conversion module further has:
a full-wave rectifier having an input terminal connected to the pair of blades; and
a pulse width modulation (PWM) module connected to the full-wave rectifier and having an output terminal connected to the output terminal of the DC conversion module.

9. The USB power adapter for AC and DC power as claimed in claim 7, wherein the DC conversion module further has a DC to DC converter, and the DC to DC converter has:
an input terminal connected to the power connection pin and the pair of blades; and
an output terminal connected to the USB connection port.

10. The USB power adapter for AC and DC power as claimed in claim 8, wherein the DC conversion module further has a DC to DC converter, and the DC to DC converter has:
an input terminal connected to the power connection pin and the pair of blades; and
an output terminal connected to the USB connection port.

11. The USB power adapter for AC and DC power as claimed in claim 9, wherein the DC to DC converter further has a controller, and the controller has:
a pair of current detection pins connected to two ends of a resistor connected to an output terminal of the controller; and
an over-voltage protection pin connected between two series-connected resistors parallelly connected between the output terminal and a ground terminal of the controller.

12. The USB power adapter for AC and DC power as claimed in claim 10, wherein the DC to DC converter further has a controller, and the controller has:
a pair of current detection pins connected to two ends of a resistor connected to an output terminal of the controller; and
an over-voltage protection pin connected between two series-connected resistors parallelly connected between the output terminal and a ground terminal of the controller.

* * * * *